United States Patent [19]
Sexton

[11] Patent Number: 5,978,593
[45] Date of Patent: Nov. 2, 1999

[54] PROGRAMMABLE LOGIC CONTROLLER COMPUTER SYSTEM WITH MICRO FIELD PROCESSOR AND PROGRAMMABLE BUS INTERFACE UNIT

[75] Inventor: Daniel White Sexton, Charlottesville, Va.

[73] Assignee: GE Fanuc Automation North America, Inc., Charlottesville, Va.

[21] Appl. No.: 08/711,370

[22] Filed: Sep. 5, 1996

[51] Int. Cl.[6] .................................................... G06F 13/00
[52] U.S. Cl. .......................... 395/821; 395/832; 395/280
[58] Field of Search .................................. 395/821, 835, 395/282, 280, 822, 832, 843; 364/238.3

[56] References Cited

U.S. PATENT DOCUMENTS

| | | | |
|---|---|---|---|
| 4,969,083 | 11/1990 | Gates | 364/147 |
| 5,056,001 | 10/1991 | Sexton | 364/200 |
| 5,072,374 | 12/1991 | Sexton et al. | 395/800 |
| 5,142,469 | 8/1992 | Weisenborn | 364/146 |
| 5,225,974 | 7/1993 | Matthews et al. | 364/140 |
| 5,274,795 | 12/1993 | Vachon | 395/500 |
| 5,307,346 | 4/1994 | Fieldhouse | 370/85.1 |
| 5,619,728 | 4/1997 | Jones et al. | 395/847 |
| 5,675,830 | 10/1997 | Satula | 395/829 |
| 5,727,219 | 3/1998 | Lyon et al. | 395/741 |

*Primary Examiner*—Robert W. Beausoliel, Jr.
*Assistant Examiner*—Scott Baderman
*Attorney, Agent, or Firm*—James H. Beusse; Holland & Knight LLP

[57] ABSTRACT

A programmable logic controller computer system is provided which achieves great flexibility in communication among the components of the system. The computer system includes a host programmable logic controller coupled by a field bus to a programmable bus interface unit. The programmable bus interface unit is located at a field station which includes a main bus to which a micro field processor and a plurality of I/O modules are coupled. The micro field processor is capable of locally processing I/O data from the I/O modules without involving the host PLC. A hand-held programmer is coupled to the programmable bus interface unit to permit the user to program an I/O map into the bus interface unit. The I/O map specifies mapping among the I/O modules, the micro field processor and the host programmable logic controllers. In this manner, communication among the I/O modules, the micro field processor and the host programmable logic controller is flexibly specified and controlled. Moreover, field bus traffic from the I/O modules back to the host programmable logic controller is significantly reduced.

22 Claims, 9 Drawing Sheets

PROGRAMMABLE LOGIC CONTROLLER COMPUTER SYSTEM WITH MICRO FIELD PROCESSOR AND PROGRAMMABLE BUS INTERFACE UNIT

BACKGROUND OF THE INVENTION

This invention relates in general to programmable logic controllers and, more particularly, to an apparatus and method for mapping the components of a programmable logic controller computer system to one another while providing local processing capability at the I/O module level.

Programmable logic controllers (PLC's) are a relatively recent development in process control technology. As a part of process control, a PLC is used to monitor input signals from a variety of input points (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted via PLC output points to various output devices, such as actuators and relays, to control the process. For example, the PLC issues output signals to speed up or slow down a conveyer, rotate the arm of a robot, open or close a relay, raise or lower temperature as well as many other possible control functions too numerous to list.

The input and output points referred to above are typically associated with input modules and output modules, respectively. Input modules and output modules are collectively referred to as I/O modules herein. Those skilled in the art alternatively refer to such I/O modules as I/O cards or I/O boards. These I/O modules are typically pluggable into respective slots located on a backplane board in the PLC. The slots are coupled together by a main bus which couples any I/O modules plugged into the slots to a central processing unit (CPU). The CPU itself can be located on a card which is pluggable into a dedicated slot on the backplane of the PLC.

FIG. 1 shows one typical conventional programmable logic controller system as system 10. System 10 includes a host programmable logic controller 15 coupled by a field bus 20 such as the GENIUS Bus (available from GE Fanuc) to a bus interface unit 25. Bus interface unit 25 couples and interfaces field bus 20 to a local bus 30 which includes a plurality of I/O terminal blocks 35. I/O terminal blocks 35 are coupled to respective I/O modules 40 as shown in FIG. 1.

It is noted that in system 10, all computational processing is performed by the host programmable logic controller 15. In other words conditions are sensed at I/O modules 40 and input data is derived therefrom. The input data is transferred through bus interface unit 25 and field bus 20 to host programmable logic controller 15. Host programmable logic controller 15 acts on the input data according to a control program stored in host PLC 15. Host programmable logic controller 15 processes the input data and produces output data in response thereto. The output data is transferred through field bus 20, bus interface unit 25, local bus 30 to one or more I/O modules 40. In response to the output data, the I/O module receiving the output data controls an output device coupled to the I/O module. In this particular arrangement, no local processing is performed at the I/O module level, but rather all processing is performed by the host PLC.

SUMMARY OF THE INVENTION

One object of the present invention is to provide a programmable logic controller system with local processing at the I/O module level.

Another object of the present invention is to provide a programmable logic controller system with a programmable bus interface unit coupling the host PLC to a local field processor PLC and I/O modules.

Yet another object of the present invention is to provide a programmable logic controller system including a programmable bus interface unit which is programmable to control mapping between the host PLC, the field PLC and the I/O modules of the system.

In accordance with one embodiment of the present invention, a programmable logic controller computer system is provided which includes a host programmable logic controller and a field bus coupled to the host programmable logic controller. The computer system further includes a main bus and a plurality of I/O ports coupled to the main bus. The computer system also includes a field programmable logic controller coupled to the main bus. Still further, the computer system includes a programmable bus interface unit, coupled to the host programmable logic controller via the field bus and further coupled via the main bus to the plurality of I/O ports and the field programmable logic controller. The bus interface unit is advantageously programmable to control mapping between the host programmable logic controller, the plurality of I/O ports and the field programmable logic controller. In this manner, substantial improvement in the flexibility in the configuration and operation of a programmable logic controller computer system is achieved.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
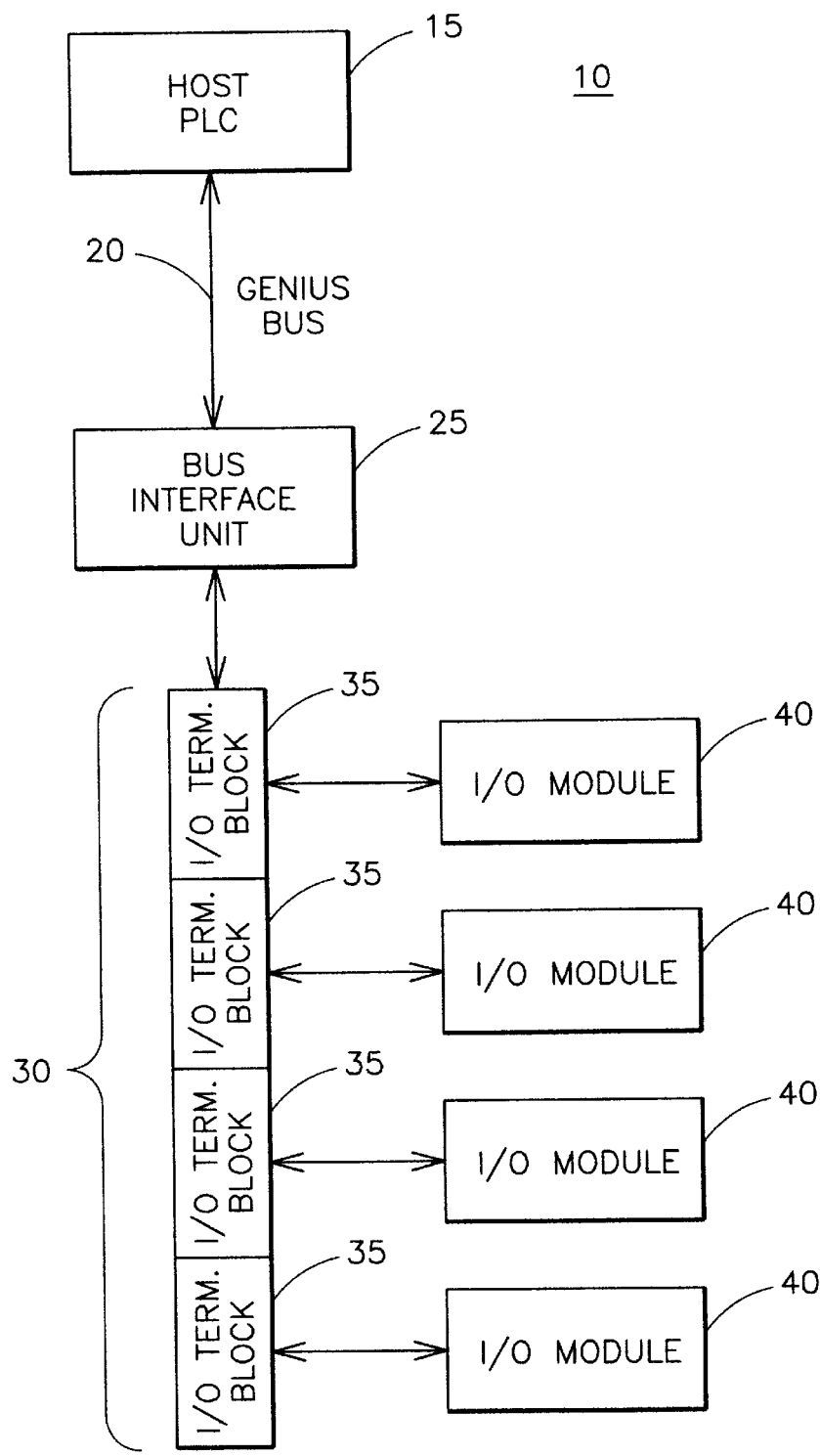
FIG. 1 is a block diagram of a conventional programmable logic controller computer system having a host PLC.
Figure 2:
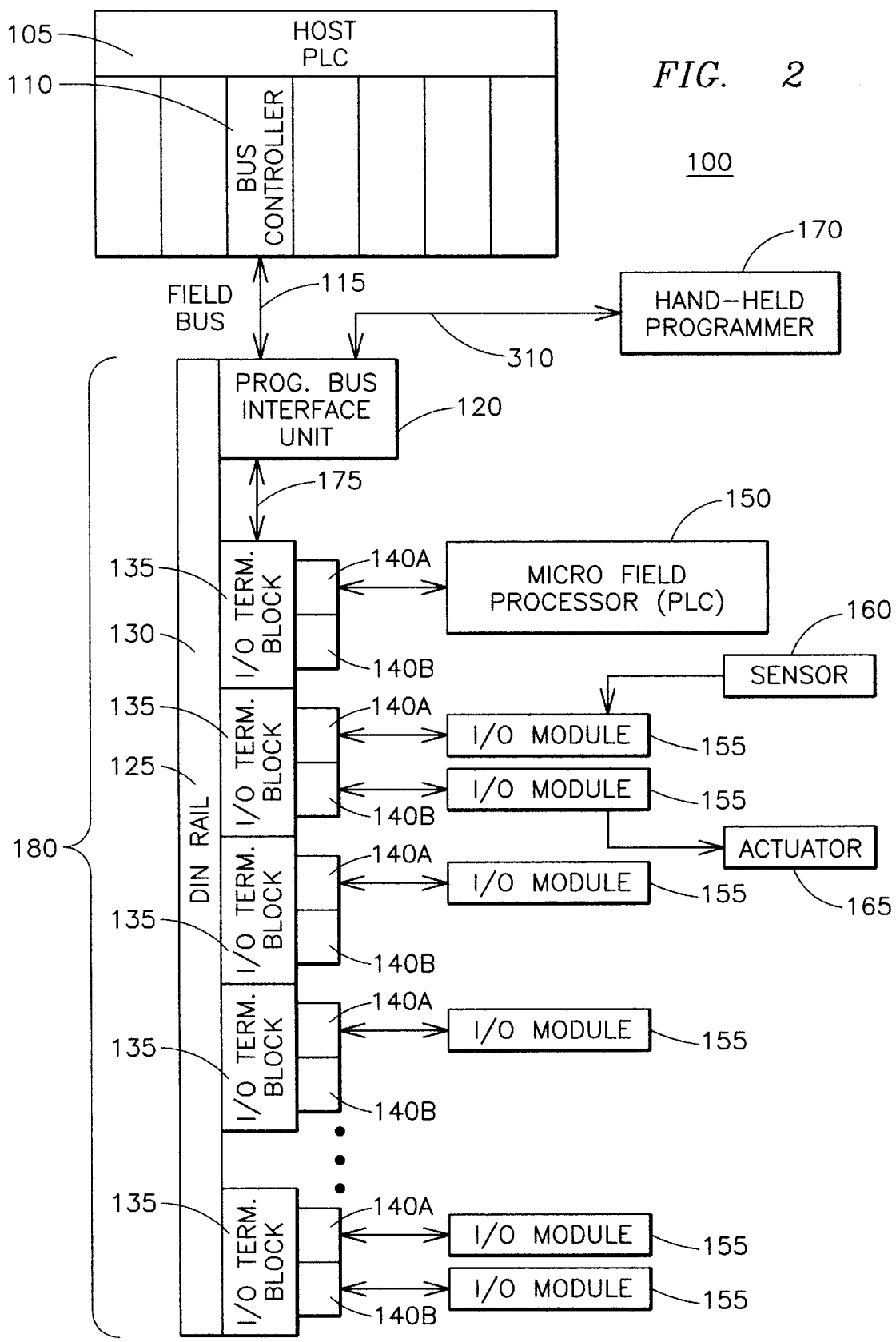
FIG. 2 is a block diagram of the disclosed PLC computer system having a host PLC, a field PLC and a programmable bus interface unit.

FIG. 2 is a block diagram showing the disclosed programmable logic controller computer system as system 100.

System 100 includes a host programmable logic controller (PLC) 105 having a bus controller 110. Bus controller 110 is coupled via a field bus 115 to a programmable bus interface unit 120. One field bus which can be employed as field bus 115 is the GENIUS Bus which is available in programmable logic controller systems sold by GE Fanuc. Programmable bus interface unit 120 and the components coupled thereto are typically located at a site remote from host PLC 105. Thus, field bus 115 couples host PLC 105 to bus programmable interface unit 120 which is located in the field.

A main bus 125 is coupled to bus interface unit 120 as shown in FIG. 2. In actual practice, main bus 125 is formed on a DIN rail 130 to which a plurality of I/O terminal blocks 135 are connected. In this particular embodiment, each I/O terminal block 135 includes two slots designated 140A and 140B. A field control processor 150 (micro field processor) is coupled to one of the slots 140A in an I/O terminal block 135 as shown in the illustration. I/O modules 155 are coupled to respective slots 140A and 140B at terminal blocks 135 as shown. Input devices such as sensor 160 and output devices such as actuator 165 are coupled to I/O modules 155 as shown. For simplicity, only a single sensor 160 is shown coupled to one I/O module 155 and only as single actuator 165 is shown to coupled to another I/O module 155. It should be understood that in actual practice, input devices/sensors 160 and output devices/actuators 165 will be coupled to several respective I/O modules 155 according to the complexity of the particular controlled process. In other embodiment, a particular I/O module 155 can have an input device coupled thereto or an output device coupled thereto, or both an input device and an output device coupled thereto. Each I/O module 155 includes an I/O port where a sensor or actuator is connected. The term I/O port is used interchangeably with the term I/O module herein. An I/O station 180 is formed by DIN rail 130, programmable bus interface unit 120, main bus 125, the plurality of I/O terminal blocks 135, field processor 150, I/O modules 155, sensors 160 and actuators 165.

Since field processor 150 is physically located in close proximity to I/O terminal blocks 135 and I/O modules 155, local processing of input data to derive output data can be accomplished at the local level near the I/O modules without involvement of the host PLC. Consequently, bus traffic between the local I/O modules 155 and the host PLC 105 is significantly reduced.

Programmable bus interface unit 120 exhibits the very desirable capability of being able to map communications among the host PLC 105, micro field processor 150 and I/O modules 155. In this manner, the I/O modules can communicate with other I/O modules, the field processor can communicate with the I/O modules, the field processor can communicate with the host PLC and the host PLC can communicate with the I/O modules. More specifically, programmable bus interface unit 120 programmably controls the 7 different types of mapping depicted in Table 1 below:

TABLE 1

| Mapping From: | Mapping To: |
| --- | --- |
| host PLC | field PLC |
| host PLC | I/O ports |
| field PLC | host PLC |
| field PLC | I/O ports |
| I/O port | host PLC |
| I/O port | field PLC |
| I/O port | other I/O ports |

The particular mapping for programmable bus interface unit 120 is user selectable. A programming device such as a hand-held programmer 170 is coupled to programmable bus interface unit 120 to permit the user to configure mapping among the devices described above according the particular TABLE 1 mappings which are desired by the user for a particular control process applications. In other words, the user can select one of more of the possible mappings depicted in TABLE 1 and corresponding mapping configuration information will be provided by hand-held programmer 120 to programmable bus interface unit 120 for storage therein.

In an alternative embodiment, instead of hand-held programmer 120, a hand-held monitor such as the GE Fanuc Series 90-30 controller hand-held programmer (Part No. IC693PRG300) can be employed to select the desired mapping and to communicate the mapping configuration information to programmable bus interface unit 120. In that particular embodiment, a field bus 115 such as the General Electric "GENIUS bus" would be employed as field bus 115 and the hand-held monitor would be coupled directly to the GENIUS bus rather than to programmable bus interface unit 120. In this operational scenario, the mapping configuration information travels from the hand-held monitor over GENIUS field bus 115 to programmable bus interface unit 120 where the configuration information is permanently stored therein.

In FIG. 2, a serial bus 175 couples programmable bus interface unit 120 to main bus 125 and I/O terminal blocks 135 along DIN rail 130 as shown. While bus interface unit 120 is shown schematically as being spatially separated from the closest I/O terminal block 135, in actual practice bus interface unit 120 may physically abut the closest I/O terminal block 135.

Field processor 150 (micro field PLC 150) advantageously permits local processing of input data received from I/O modules 155 and transmission of responsive output data to I/O modules 155 without involvement of host PLC 105. Bus traffic back to host PLC 105 is thus substantially reduced. Field PLC 150 processes input data and generates output data according to a control program stored therein. To facilitate local processing of input data from I/O modules 155, hand-held programmer 170 is used to select the appropriate mapping from Table 1 to instruction programmable bus interface unit 120 to map the I/O ports of I/O module 155 to send input data back to field PLC 150 and to send output data/instructions from field PLC 150 to the I/O ports of I/O modules 155.

Field processor 150 reports results back to host PLC 105 according to the particular control program stored in field processor 150 and in accordance with the particular mapping selected for programmable bus interface unit 120. Alternatively should more involvement of the host PLC 105 be desired for a particular process control application, the appropriate mapping to involve host PLC 105 can be selected from Table 1 using hand-held programmer 170. For example in this instance programmable bus interface unit 120 can be programmed to map the I/O ports of I/O module 155 to send input data back to host PLC 105 and to send output data/instructions from host PLC 105 to the I/O ports of I/O modules 155.

Figure 3:
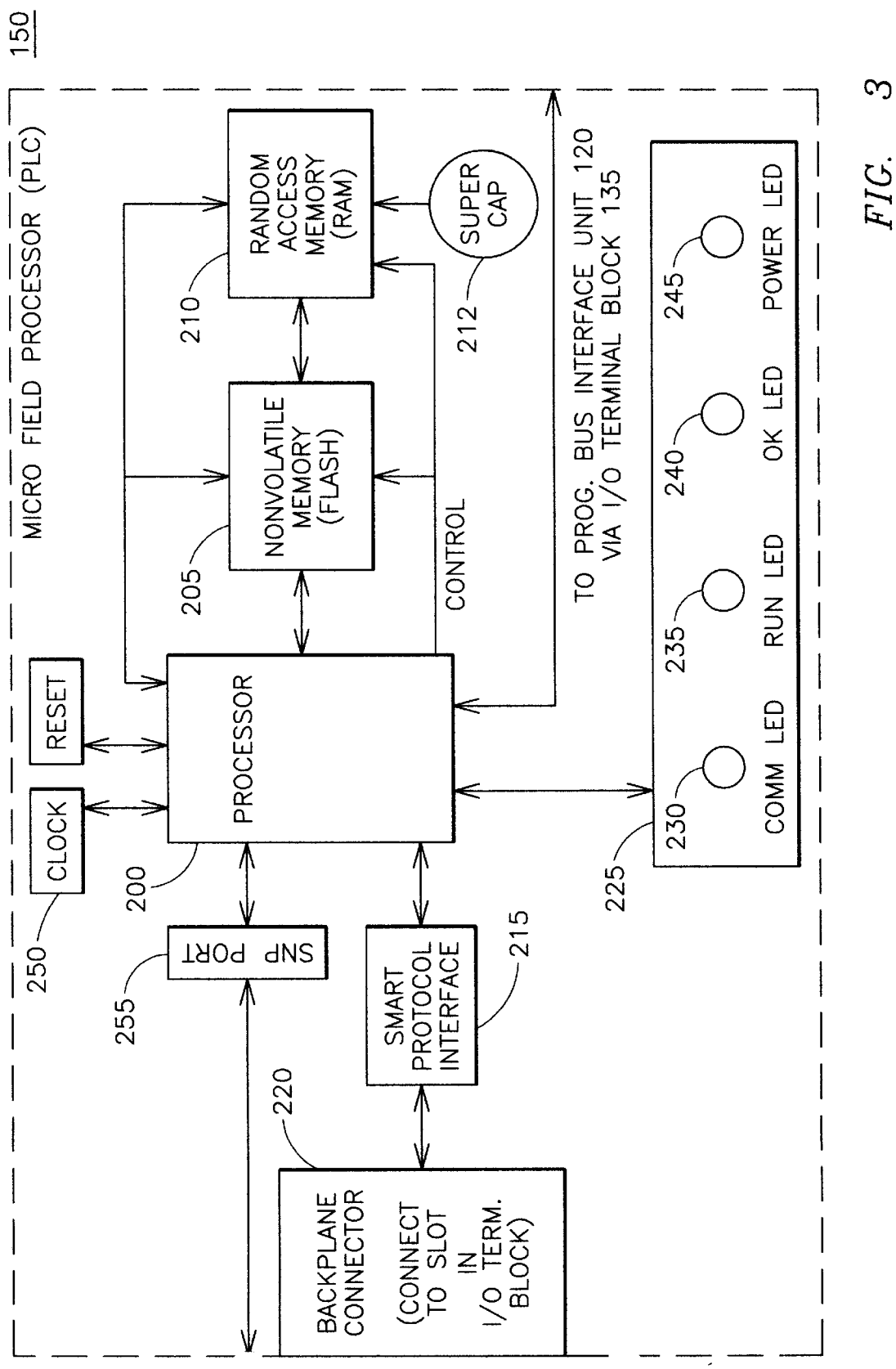
FIG. 3 is a block diagram of the field PLC (micro field PLC) of FIG. 2.

Micro field processor 150 is now described in more detail with reference to FIG. 3. Field processor 150 includes a processor 200 such as the model H8/3003 microprocessor available from Hitachi, Ltd of Japan. Processor 200 processes input information and generates responsive output information according to a control program stored in non-volatile memory 205 coupled thereto. A CMOS random access memory (RAM) 210 is coupled to processor 200 to provide memory space for facilitating execution of the control program Super capacitor (super cap) 212 provides charge to RAM 210 to maintain the contents of CMOS RAM 210 for approximately 3–4 days. A smart protocol interface 215 couples processor 200 to backplane connector 220 which couples field processor 150 to a particular slot 140A or 140B at an I/O terminal block 135. Smart protocol interface 215 interfaces the particular communication protocol of main bus 125 (for examples as implemented in a XILINX 3030) to processor 200.

A status light strip 225 including four status light emitting diodes (LEDs) is coupled to processor 200 as shown to display process status information. More particularly, status light strip includes a COMM LED 230 for indicating when micro field processor 150 is communicating COMM LED 230 blinks during communication over SNP port 255. Status light strip 225 further includes a RUN LED 235 for indicating when field processor 150 is executing control instructions. More particularly, the RUN LED is lighted when field PLC 150 is executing a logic program entered by the user (RUN mode). The RUN LED is caused to blink if a fault is detected during self-diagnostics. Status light strip 225 also includes a status OK LED 240 which is lighted to indicate that field processor 150 is operating properly. The status OK LED is caused to blink during self diagnostics. It also blinks together with the RUN LED if a fault is detected during self diagnostics. The status light strip 225 also includes a POWER LED 245 to indicate the field processor 150 is powered up. More particularly, the POWER LED is lighted if power is supplied to the field PLC and the power supply (not shown) is operating correctly. The POWER LED is not lighted if a power supply fault occurs or if power is not applied to the field PLC. A clock oscillator 250 is coupled to processor 200 to provide a time base thereto. A GE Fanuc Series 90 protocol (SNP) port 255 is provided to processor 200 as shown. SNP port can be coupled to hand-held programmer 170 for purposes of programming field processor 150.

Programmable bus interface unit 120 is now described with reference to FIG. 4. Programmable bus interface unit 120 includes a processor 300 such as the model V25 available from NEC. It will be recalled that programmable bus interface unit 120 is programmed by the user to map devices in system 100 according to one or more mapping selections from Table 1. As seen in FIG. 2, programmable bus interface unit 120 is coupled between host PLC 105 and main bus 125 so that it is in position to implement the selected mapping. Returning to FIG. 4, processor 300 is coupled via field bus interface 305 to field bus 115. Field bus interface 305 is an interface which adapts the information protocol from processor 300 to the particular communications protocol selected for field bus 115, and vice versa. For example, in an embodiment wherein the GE GENIUS bus protocol is selected for field bus 115, a GENIUS bus field bus interface is used as field bus interface 305. Processor 300 is also coupled to main bus 125 and the I/O terminal blocks as indicated.

The particular desired mapping is selected by the user who inputs mapping choices from Table 1 using hand-held programmer 170. Hand-held programmer 170 includes alphanumeric input keys (not shown) by which the user can input desired device mapping choices. Hand-held programmer 170 is coupled to programmable bus interface unit 120 by a serial bus 310 therebetween as shown in FIG. 4 and FIG. 2. Serial bus 310 couples processor 300 to programmable bus interface unit 120 such that the mapping selection information (user selected configuration data) is communicated from the hand-held programmer 170 to programmable bus interface unit 120.

In another embodiments a hand-held monitor such as the GE GENIUS model can be used in place of hand-held programmer 170. In that case, rather than coupling the hand-held monitor to the programmable bus interface unit 120 via serial bus 310, instead the hand-held monitor is coupled to the field bus 115 (such as the GENIUS bus). In this operational scenario, the hand-held monitor communicates mapping selection information to programmable bus interface unit 120 via the connection of the hand-held monitor to the field bus 115 (eg. the GENIUS bus). Serial bus 310 is optional and not needed in this particular application.

Figure 4:
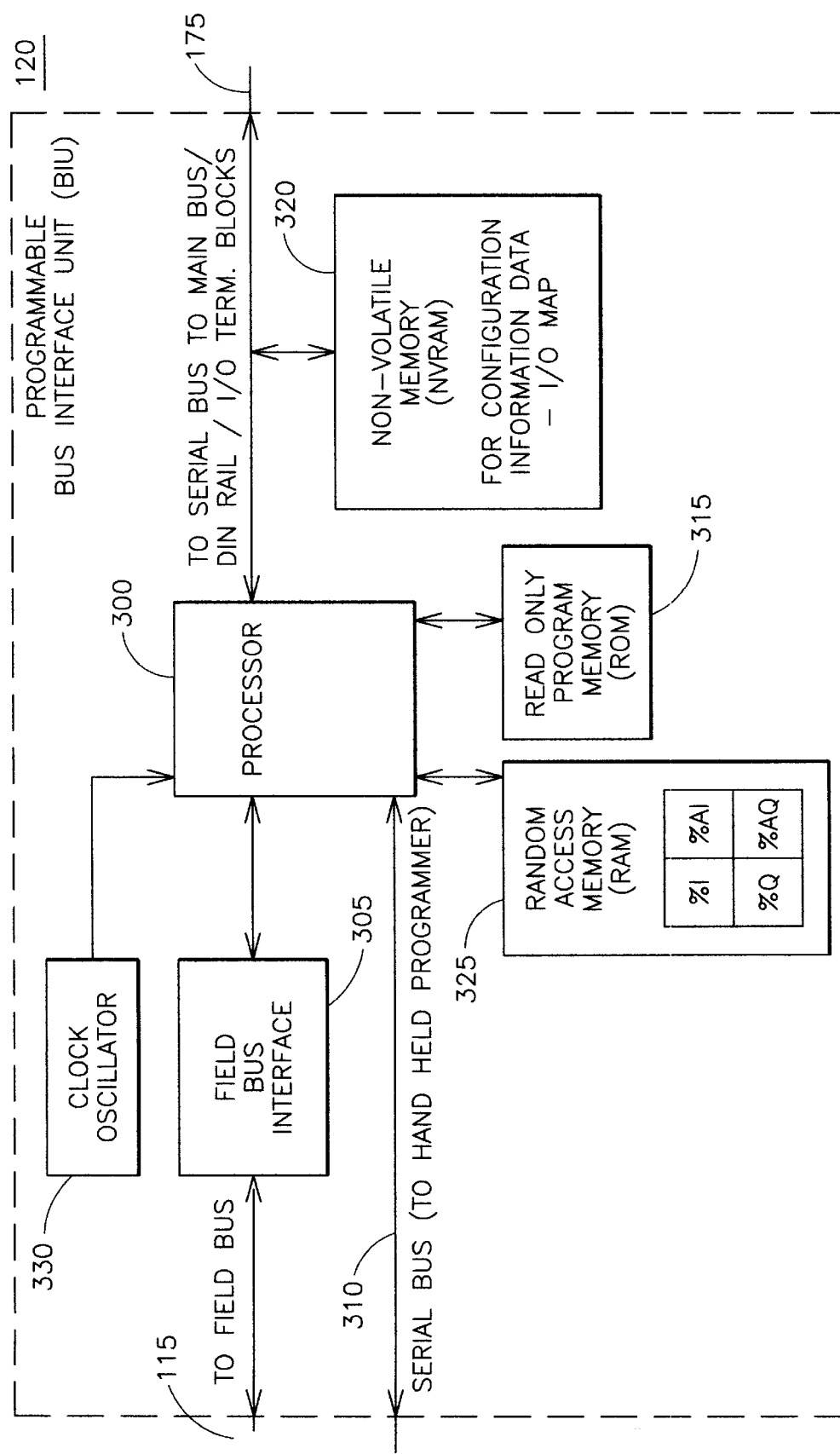
FIG. 4 is a block diagram of the programmable bus interface unit of FIG. 2.

A read only memory (RON) 315 is coupled to processor 300 as shown in FIG. 4 to provide processor 300 with a control program to guide the general mapping operation thereof as processor 300 maps devices in accordance with selected mapping configuration data provided by the user via hand-held programmer 170. The particular selected mapping configuration data received from the hand-held programmer 170 is permanently stored in a nonvolatile memory (NVRAM) 320 which is coupled to processor 300 such that bus interface unit 120 contains a permanent record of the device mapping that it is expected to implement. A random access memory (RAM) 325 is coupled to processor 300 to provide memory space for facilitating execution of its control program. A clock oscillator 330 is coupled to processor 300 to provide a time base thereto.

Programmable bus interface unit 120 interfaces I/O modules 155 to host PLC 105 via GENIUS bus 115. Bus interface unit 120 manages the movement of data within I/O station 180, and between I/O station 180 and GENIUS bus 115. In one version, bus interface unit 120 can exchange up to 128 bytes of input data and 128 bytes of output data with host PLC 105 for each bus scan. The intelligent processing capabilities of bus interface unit 120 allow the configuration of features such as fault reporting, selectable input and output defaults, analog scaling and analog range selection for the I/O modules attached thereto at a particular station. Moreover, the bus interface unit performs diagnostic checks on itself and its associated I/O modules 155, and relays diagnostic information to the host PLC (if configured for fault reporting) and to hand-held programmer 170.

As depicted in FIG. 4, bus interface unit (BIU) 120 includes %I, %AI, %Q and %AQ internal memories within non-volatile memory 320 which are used for I/O data. The selected mapping desired by the user, and input via the hand-held programmer 170, is permanently stored in an I/O map in nonvolatile memory 320. Upon initialization of the system, the I/O map is transferred from nonvolatile memory 320 to random access memory 325. All configuration information is transferred, such as, for example, prefault information, module configuration, network configuration.

The following Table 2 shows the maximum amount of each data type that may be configured in the I/O map, and the highest reference address available for each type in one particular embodiment.

TABLE 2

| Memory Type | Purpose | Maximum Length for BIU I/O Map | Highest Available Ref. Address |
| --- | --- | --- | --- |
| %I | discrete inputs, and status data from intelligent modules | up to 1024 contiguous bits | 65535 |
| %Q | discrete inputs, and status data from intelligent modules | up to 1024 contiguous bits | 65535 |
| %AI | analog inputs | up to 64 contiguous bits | 9999 |
| %AQ | analog outputs | up to 64 contiguous bits | 9999 |

Individual I/O modules 155 may be configured anywhere within the available memory of the bus interface unit. Ordinarily, the references (addresses) assigned to data in the BIU memory match the references used for the same data in the host PLC 105. It is also possible to have inputs or outputs within I/O station 180 that are not exchanged on GENIUS bus 115 namely, data that are completely local to I/O station 180. For example, I/O station 180 can include a field processor 150 also know as a micro field processor (MFP) which performs local data processing without involvement of host PLC 105.

Data to be exchanged on GENIUS bus 115 must use references within the I/O map configured for bus interface unit 120. Any I/O module references configured outside the I/O map will be scanned by bus interface unit 120, but the data will not be exchanged on GENIUS bus 115. To reiterate, the I/O map of the station determines the types and amounts of data exchanged on GENIUS bus 115. The I/O map is part of the configuration of bus interface unit 120. The parameters of the I/O map are listed in Table 2 above.

So-called "conventional" (non-intelligent) I/O modules or intelligent I/O modules may be employed as I/O modules 155. Conventional I/O modules provide or receive just one type of I/O data, usually referred to as their input or output data. Normally, this data is assigned to the reference types shown below in Table 3 (although any module's data can be assigned to any data type in BIU memory).

TABLE 3

| Type of Module | Type of Data |
| --- | --- |
| discrete inputs | %I |
| analog inputs | %AI |
| discrete outputs | %Q |
| analog outputs | %AQ |

Bus interface unit 120 reads inputs from all conventional input modules and sends outputs to all conventional output modules during every sweep of operations. In other words reference data is transferred each BIU sweep.

Unlike conventional I/O modules, "intelligent" I/O modules available from GE Fanuc such as the Micro Field Processor, Thermocouple, RTD, and High Level Analog Input module provide and receive multiple types of I/O data. Each of these types of data are assigned to a reference type. Reference parameters define the data types and amounts of each data types an intelligent module needs. For example, the GE Fanuc 16 Point Grouped High Level Analog Input Module provides and receives the following types of data (defined by the module's reference parameters)

1) 16 (two-byte) analog inputs for channel input data. This data is typically configured to use %AI memory, although that is not required;
2) 88 bits of discrete inputs (%I) for module and channel status data;
3) 16 bits of discrete outputs (%Q) or fault-clearing commands to the module.

Bus interface unit 120 reads input data from intelligent modules and sends output data to intelligent modules during every "sweep" of operations. However, reference parameters are only read at power-up or when a module is being configured by the BIU.

Intelligent modules can also be configured for "Group" data transfer with bus interface unit 120 or with other intelligent devices in the same field control station 180. A data group is a configured set of data that the bus interface unit transfers from one location to another location in the station. Bus interface unit 120 can transfer the group data during every sweep of its operations, or only during specified sweeps. This ability to "skip" group data transfer during certain sweeps makes it possible to shorten the BIU's overall sweep time. In one particular embodiments up to 16 groups can be set up for an I/O station. A group contains data from only one module to only one module. Either module may be an I/O module, a micro field processor, or the bus interface unit. A group can be formed by a combination of the %I, %Q, %AI, %AQ data, or any other data type a module may supports. For each data types a starting offset and length can be specified. It is not necessary to move all of a module's data. The data does not need to be moved during each BIU sweep.

For each group moves bus interface unit 120 can move data in one direction, to or from any device in I/O station 180 including itself. Both devices are identified by specifying their "slot" number as part of the group configuration The group move configuration specifies the two devices' slot numbers, the direction of the move, and the data lengths and locations.

For group data only, the bus interface unit can move the data on each sweep, or on any combination of up to 16 sweeps. The selection of sweeps is made when configuring the group.

The sweep action of bus interface unit 120 is now described in more detail as it collects input data from the various I/O modules 155 and sends output data to the various I/O modules 155. Reference is now made to the flow chart of FIG. 5 which depicts the steps taken by the system in the course of executing this sweep action.

As indicated in step 410, bus interface unit 120 first reads inputs from any of I/O modules 155 which are conventional I/O modules (i.e., non-intelligent modules). The bus interface unit (BIU) combines input data with any corresponding forced data and puts it in its input data tables at the configured locations. If an I/O module fails to supply valid input data, bus interface unit 120 generates a fault report to host PLC 105. If the I/O module is configured for Hold Last State, the bus interface unit holds the module's data at its last valid state. If the I/O module is configured to default its inputs, the BIU places zeros in the I/O module s assigned references for all inputs that are not forced. Any forced inputs retain their forced states. For inputs from conventional analog modules, the BIU also performs scaling, calibration, alarm checking, and range checking.

As shown in step 420, BIU 120 next reads all configured discrete and analog references parameters from "intelligent"

I/O modules (including micro field processor 150). If a module fails to supply valid input data, the BIU generates a fault report to the host PLC 105. If the I/O module is configured to Hold Last State, the BIU holds the module's data to its last valid state. If the I/O module is configured to default it inputs, the BIU places zeros in the module's assigned references for all inputs that are not forced. Any forced inputs retain their forced states.

As indicated in step 430, BIU 120 next reads the input group data for which the destination is slot 0 (the BIU) from all intelligent modules except a Synchronization module. (It is noted that in actual practice, BIU 120 is plugged into a slot (not shown) on DIN rail 130. The slot into which the BIU is plugged is designated as slot 0 by convention. By convention, slot 0 (not shown) is the uppermost slot on DIN rail 130. The remaining slots are designed as slots 140A and 140B at the various I/O terminal blocks 135. Using the numbering convention wherein the BIU slot is slot 0, the remaining slots would be designated slot 1, slot 2, slot 3 . . . as we proceed downwardly away from BIU 120.) BIU 120 reads only the group inputs that have been configured to be read during that sweep. If an I/O module fails to supply valid input data, the BIU generates a fault report to host PLC 105. If the module is configured for Hold Last State, the BIU holds the module's data at its last valid state. If the module is configured to default its inputs, the BIU places zeros in the module's assigned references for all inputs that are not forced. Any forced inputs retain their forced states.

Then, in step 440, BIU 120 sends group data to a synchronization module if present at one of I/O terminal blocks 135. More particularly, if an I/O module (usually a micro field processor) has been configured as a Synchronization module, BIU 120 next transfers group data assigned to be sent to it during that sweep.

As per block 450, BIU 120 sends its reference parameter data from the BIU tables therein to such Synchronization modules. More particularly, the bus interface unit sends outputs from the BIU table to any Synchronization modules.

In block 460, bus interface unit 120 moves all current discrete and analog input values presently in its network map from the BIU map into a memory buffer or communications buffer (not shown) in preparation for transmitting them on GENIUS bus 115. Then, in block 470, after moving the inputs into a communications buffer (not shown) in the BIU, the BIU moves newly-received output data from the communication buffer. The BIU combines this data with any existing forced discrete output states and analog value and places the combined data in its discrete (%Q) and analog (%Q) output memories, as defined in the BIU I/O map. If BIU 120 is not receiving outputs from the bus, it sets mapped output references for conventional I/O modules to their fault/hold last state conditions, then forces them. For any intelligent module set up for defaults, the BIU sets output table references to their forced state or value, or to zero.

BIU 120 then waits at step 470 until micro field processor 150 is not busy. Once field processor 150 is found not be busy, then process flow continues to block 480 at which if a particular I/O module 155 has been configured as a synchronization module, then BIU 120 moves all configured reference parameter data from the module to the BIU's internal memory tables, then applies any forces. If the Synchronization module is busy, the BIU waits then retries. If the BIU is unable to move the data after five seconds, it sets it own corresponding memory locations to zero or holds its last states, as configured from the Synchronization module. In other words, in block 480 all reference input parameters are read from Synchronization modules.

As per block 490, all group data are read to BIU 120 from such synchronization modules. In other words, if an I/O module 155 has been configured as a Synchronization module, BIU 120 moves all its defined group data to the BIU's internal tables and then applies any forces. If BIU 120 is unable to read the specified data, then BIU 120 generates a fault report, and defaults the data to 0 or holds its last states, depending on the modules s configuration. If any of the data items are presently forced, those forces are retained.

In block 510, BIU 120 sends output data to the conventional output modules (ie. those I/O modules 155 which are conventional output modules) in I/O station 180. Discrete output modules automatically echo the received outputs back to the BIU. If a module fails to echo its outputs, the BIU generates a fault report for that module. If the module is configured for output defaulting, the BIU attempts to set outputs to their default states. For conventional analog modules, the BIU converts data from the selected scaled inputs and performs range checking before sending the outputs.

Figure 5:
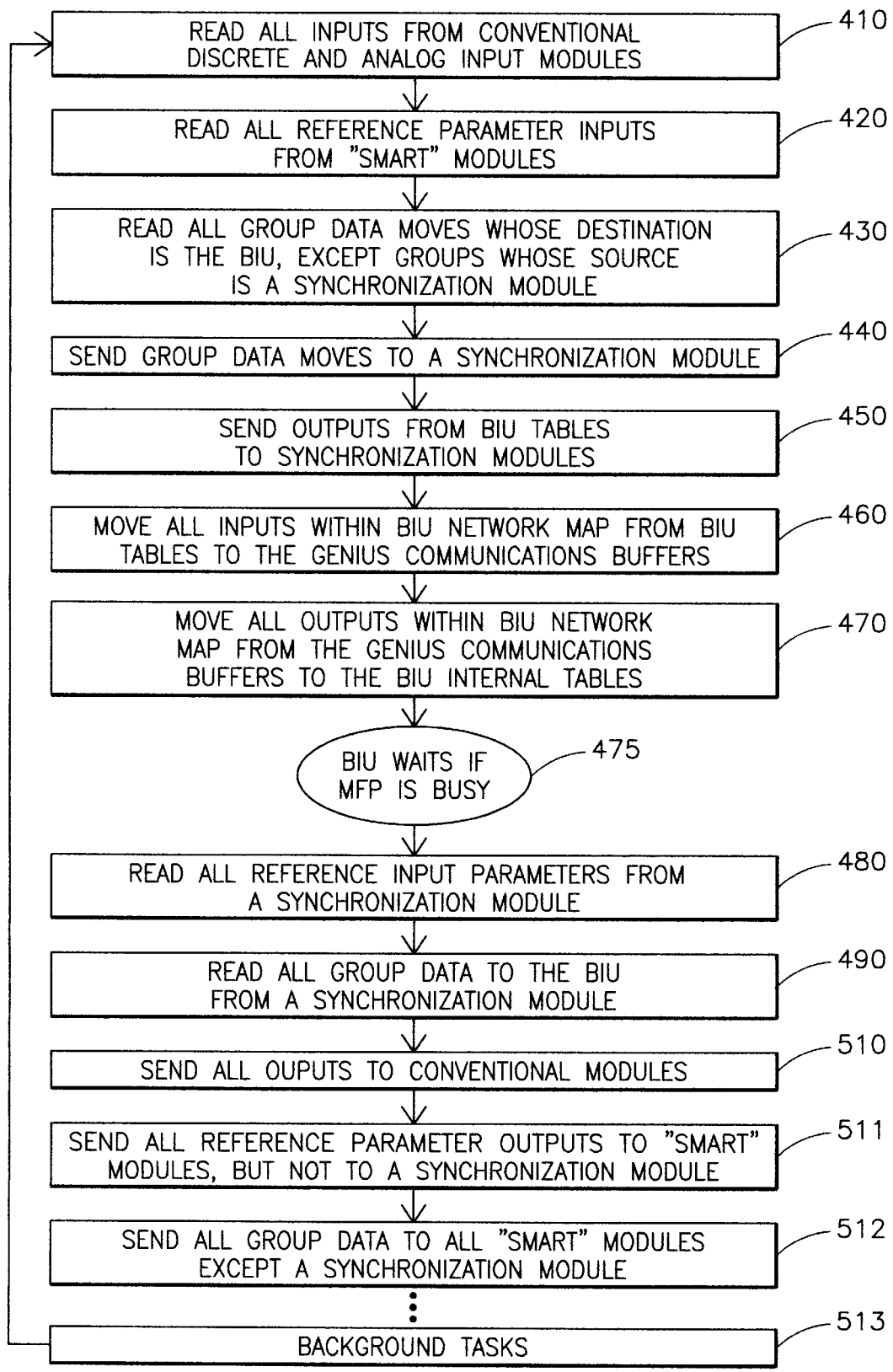
FIG. 5 is a flow chart depicting the sweep performed by the bus interface unit.

As per block 511 of the flow chart of FIG. 5, bus interface unit 120 next sends reference parameter data from its table to any of I/O modules 155 which are intelligent modules except a Synchronization module. If bus interface unit 120 is unable to contact a module, it generates a fault report. Then, in block 512, bus interface unit 120 moves group data from the intelligent module or from its own internal memories to any intelligent module (except a Synchronization module) that is configured to receive data during that sweep. If the move fails, a fault is generated. After performing all the data transfer described above, bus interface unit 120 performs a sequence of background tasks such as fault processing, scanning module ID's and testing memory.

Micro field processor 150 is now discussed in more detail. Micro field processor 150 is a specialized micro programmable logic controller (PLC) which provides local input/output logic within field control I/O station 180. The micro field processor itself does not perform an I/O scan, rather, that function is performed by bus interface unit 120.

Operation of the field processor 150 is synchronized with that of BIU 120. This synchronization is set up during BIU configuration. It is noted that synchronization between field processor 150 and BIU 120 occurs at the following four steps or blocks of Table 4 which are shown in the flow chart of FIG. 6;

TABLE 4

| block 650 | field processor 150 waits for group data from BIU 120 |
| block 605 | field processor 150 waits for its input reference parameter data from bus interface unit 120 |
| block 630 | after solving its logic program, field processor 150 waits for the BIU to request its output reference parameter data. Alternatively, if the field processor is still busy, the BIU waits for the field processor to finish solving its logic program. |
| block 640 | field processor 150 waits for the BIU to request any group data from the field processor. |

Figure 6A:
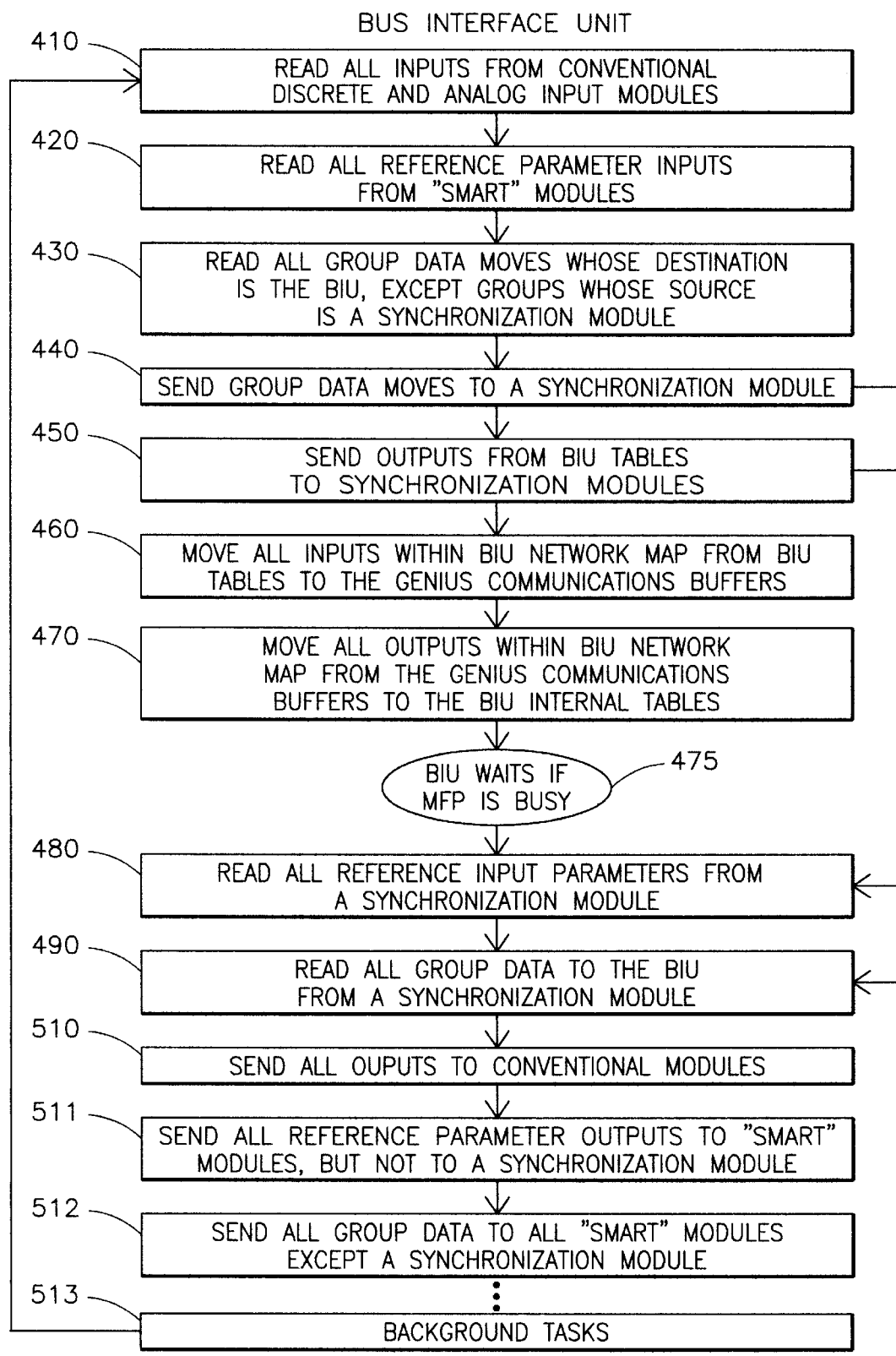
FIG. 6 is a more detailed flow chart depicting the sweep performed by the bus interface unit together with synchronization steps for a field processor.
Figure 6B:
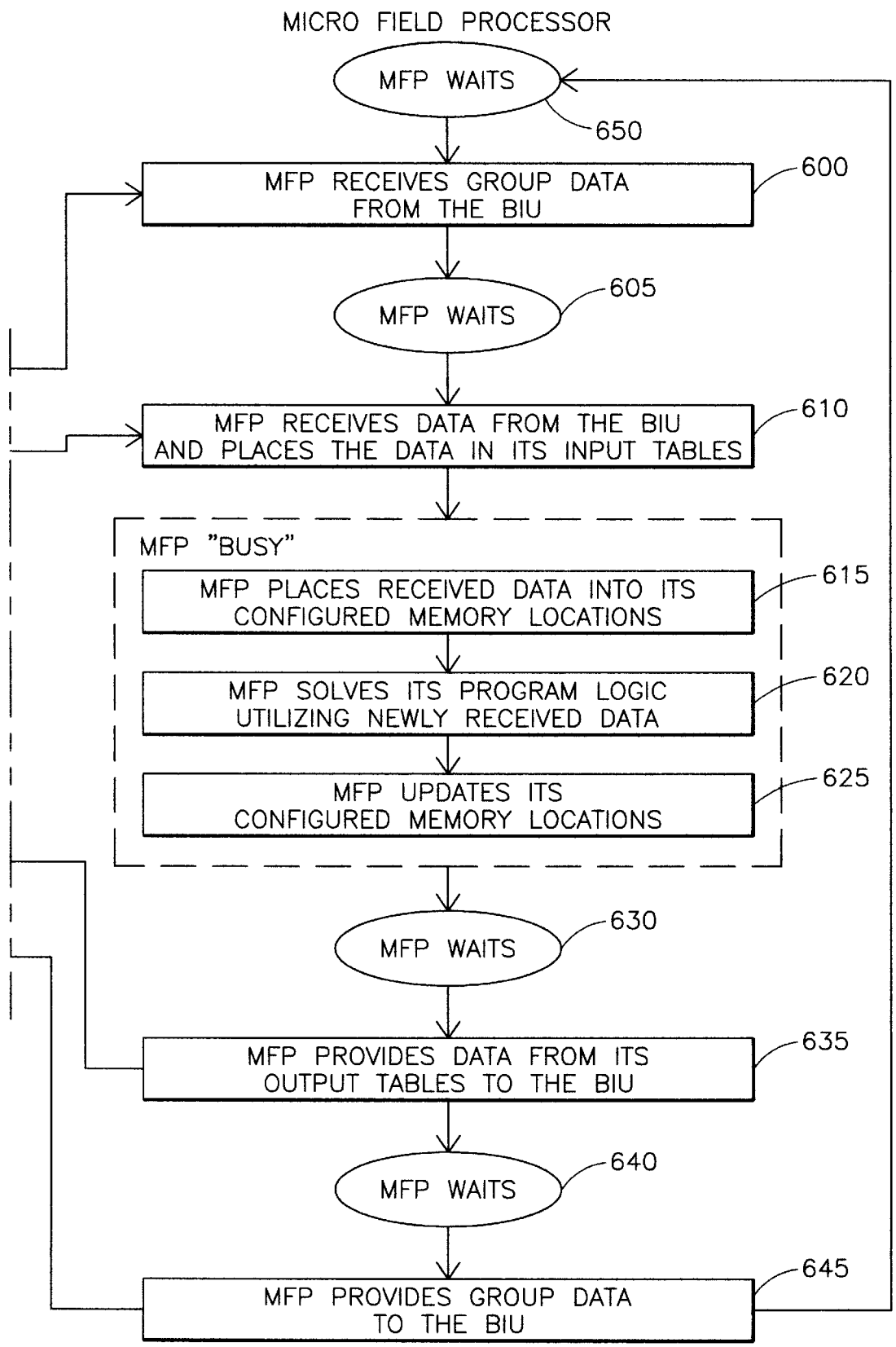

The flow chart of FIG. 6 is a more detailed version of the flow chart of FIG. 5 which is altered to show steps in the operation of micro field processor 150 and the synchronization of micro field processor 150 with respect to bus interface unit 120. Micro field processor 150 is indicated as receiving group data from bus interface unit 120 at block 600. Field processor 150 then waits at block 605 and receives data from bus interface unit 120 and places the data in its input table as per block 610. In subsequent blocks 615, 620 and 625, micro field processor 150 is "busy" with the tasks now described. In step 615, field processor 150 places received data into its configured memory locations. Then, field processor 150 solves its program logic utilizing the newly received data as per block 620. Next, field processor 150 updates its configured memory locations at block 625 and then waits at block 630. Micro field processor 150 subsequently provides data from its output tables to bus interface unit 120 at block 635 and then waits 640. Then, micro field processor 150 provides group data to bus interface unit 120 as per step 645 and then waits at block 650.

Micro field processor 150 includes the following memory references. %I001 to %I512; %Q001 to %Q512; %AI001 to %AI128; %AQ001 to %AQ128, %R0001 to %R2048; %S001 to %S128; %T001 to %T256; %G0001 to %G1280, and %M0001 to %M1024. These references are called MFP references. References employed by host PLC 105 are generally mapped to these references.

Micro field processor 150 exhibits multiple operating modes, for example, a "Standard Program Sweep" mode, a "Constant Sweep" mode and a "Stop" mode. In the "Standard Program Sweep" mode, micro field processor 150 executes each sweep as quickly as possible with a varying amount of time consumed for each sweep. In the "Constant Sweep" mode, each sweep consumes the same amount of time. The time is configurable to be between 5 to 200 milliseconds in one embodiment. When micro field processor 150 is in the "Stop" mode, the application program is not executed. In this mode, it is possible to choose whether or not the I/O is scanned (internally by the micro field processor) and whether communications with hand-held programmer 170 will continue. If bus interface unit 120 requests data from micro field processor 150 while micro field processor 150 is in the Stop mode, the requested data will either be defaulted or held in its last state, depending on the configuration of the micro field processor.

To reiterate, bus interface unit 120 stores the configuration parameters for the station 180 formed by field processor 150 and I/O modules 155. As indicated in Table 2, bus interface unit 120 includes %I, %AI, %Q and %AQ internal memories which are used for I/O data. Bus interface unit 120 scans I/O modules 155 and field processor 150 to receive updated input data from sensors 160 and to provide responsive output data back to actuators 165 coupled to the I/O modules 155. The aforementioned internal memories %I, %AI, %Q and %AQ in bus interface unit 120 are used to store the station's I/O data. Bus interface unit 120 communicates with host PLC 105 over GENIUS bus 115, sending up to 128 bytes of input data and receiving up to 128 bytes of output data during each GENIUS bus scan.

At power-up, bus interface unit 120 performs a series of self-diagnostic tests including EPROM checksum verification, RAM testing and GENIUS communication testing. Next, bus interface unit 120 starts scanning the I/O modules 155 at station 180 to identify all I/O modules that are present at the station. All I/O in the stations except those that are presently forced, default to a preprogrammed output default state. I/O that are forced at the time of power-up start operation in the forced state or value. Outputs remain at the output default state until the I/O module receives output data from the host PLC 105 controlling bus interface unit 120.

Following a successful start-up, bus interface unit 120 goes into the last programmed operating mode. It remains in this mode until commanded to change modes. In "Run mode", input modules are scanned in order of physical location. Bus interface unit 120 stores the input data in its own %I and %AI memories. These memories contain the most recent value for each input. After the input scan, bus interface unit 120 scans the output modules in order, sending them the most recent output data from its internal %Q and %AQ.

More specifically, after each bus scan, programmable bus interface unit 120 exchanges the following data with host PLC 105 and/or field processor 150 depending on the particular mapping selected by the user for bus interface 120. 1) bus interface unit 120 sends an input message to host PLC 105 and/or field processor 150 with up to 128 bytes of %I and/or %AI inputs; 2) bus interface unit 120 receives an output message from host PLC 105 and/or field processor 150 with up to 128 bytes of %Q and/or %AQ outputs. These outputs are mapped to one or more particular I/O modules 155 depending on the particular mapping selected by the user for programmable bus interface unit 120. The length and content of these messages is determined by the station I/O map configured for bus interface unit 210.

After bus interface unit 120 completes a successful login with host PLC 105, bus interface unit 120 begins sending the input data it has scanned from the input modules and accepting output data for transmission to the output modules it controls. Communications with host PLC 105 are performed repetitively and asynchronously. When bus interface unit 120 receives a GENIUS Bus communications token, it sends the most recent data from the configured portion of its %I and %AI memories on GENIUS bus 115. As discussed above, these memories are repeatedly updated whenever the bus interface unit scans the input modules in the station 180.

Bus interface unit 120 receives new outputs from host PLC 120 when the host PLC's bus controller 110 has the communications token. Bus interface unit 120 places these outputs into the configured portion of its %Q and %AQ output tables. These outputs are then passed to the I/O modules 155 in station 180 on the next I/O scan according to the predetermined mapping. The GENIUS bus scan time typically varies from approximately 3–400 mS although 20–30 mS would be more normally employed.

It will be recalled that station 180 includes bus interface unit 120, the associated I/O modules 155 and field control processor 150. If an output in the station is tied to an input in the same station, the output changes state (or value, in the case of an analog output module) within one BIU scan. To guarantee that an output which is sent from the network changes state, that state should be present for at least one GENIUS bus scan time or one BIU scan, whichever is longer. The input which is tied to the output responds as soon as any load-effects have settled out and input filtering is completed. This may occur as soon as the bus interface unit's next I/O scan. An input must be present for at least one PLC sweep time plus one GENIUS bus scan time plus one BIU scan time to guarantee its detection by the host. If the input changes state only briefly, and then changes again before the input data is sent on the bus, the interim state may be overwritten in the bus interface unit's internal memory by some new input state or value before it can be sent to the host PLC 105 or field control PLC 150.

Figure 7A:
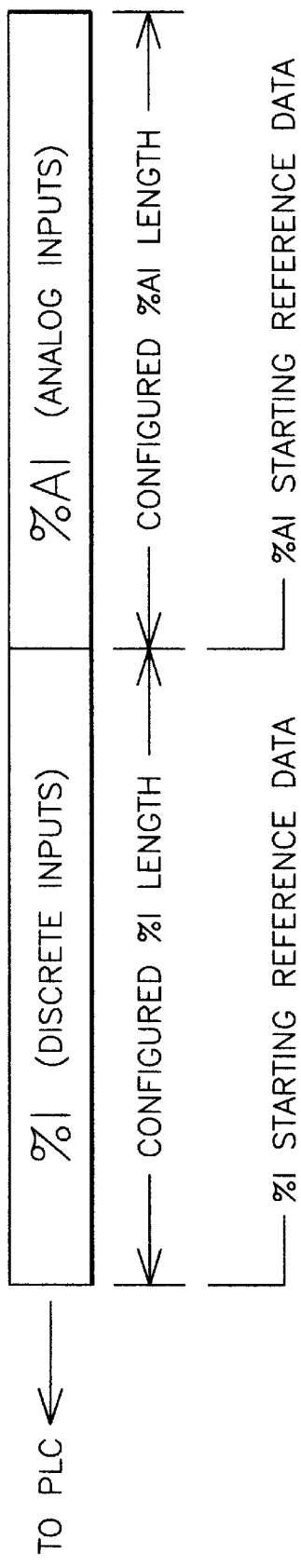
FIG. 7A is a representation of a data input message.

When bus interface unit 120 takes its turn on GENIUS bus 115, it sends one input data message containing the latest values for all configured discrete inputs of I/O modules 155 followed by all configured analog inputs of I/O modules 155. Because the input data messages are broadcast on the bus 115, the input data messages can be obtained by any bus controller on the bus 115. The format of such input data messages is depicted in FIG. 7A. The input message is shown as being divided into two portions, namely a %I portion for discrete inputs and a %AI portion for analog inputs. The lengths of each portion are equal to the configured lengths of %I and %AI data selected for bus interface unit 120 regardless of host PLC type or the actual amount of output data needed for the modules physically present in the station. Either length may be zero. The discrete inputs appear in the input message in the same sequence as their assigned input references. Each discrete input module occupies one byte per eight circuits in this particular embodiment. The analog inputs are also in the same sequence as their assigned input references. Each analog input module occupies two bytes (one word) for each analog channel. Bus interface unit 120 sends this input data massage from its internal %I and %AI memories beginning at the start locations selected during station configuration.

When configuring input modules, either a default state or hold last state can be selected. If an input module is removed or fails to operate correctly, the chosen state is substituted for actual input data. A diagnostic message is provided to indicate loss of module. Forced input data is not affected. I/O data handling by host PLC 105 depends on the particular type of host employed for host PLC 105. For example, if a GE Fanuc Series 90-70 PLC is employed as host PLC 105, then this host PLC places the input data in the %I and %AI references selected during PLC configuration. These references should be the same references as those selected during the configuration of bus interface unit 120. In contrast, if a GE Fanuc Series Six or Series Five PLC is employed as host PLC 105, then input data is placed into an I/O table or into the register memory of the PLC.

Figure 7B:
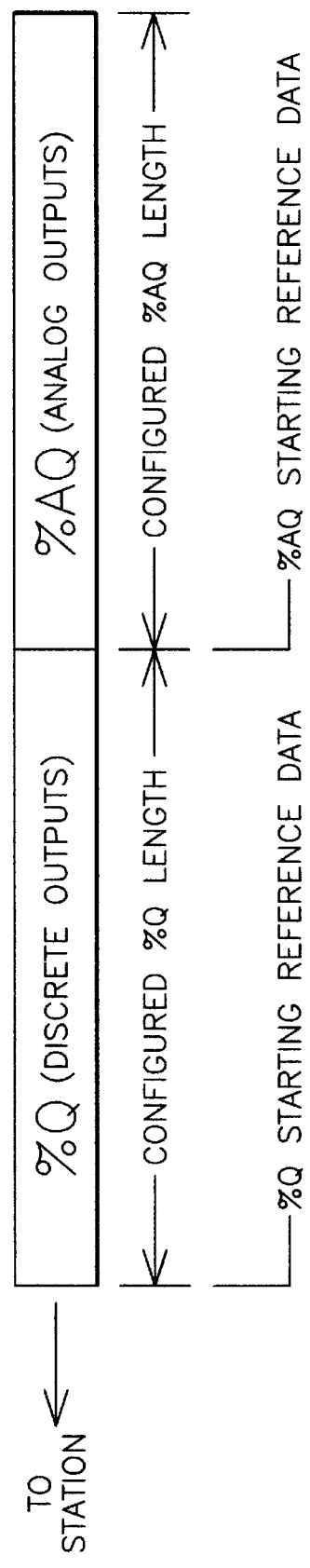
FIG. 7B is a representation of a data output message.

The handling of output data from host PLC 105 to station 180 is now briefly discussed. Each time that host bus controller 110 has a bus communications token, it sends any output it has received from its CPU (not shown) to I/O devices coupled to GENIUS bus 115. Outputs for bus interface unit 120 are sent in one output data message, with all configured discrete outputs followed by all configured analog outputs. The format of such output data messages is depicted in FIG. 7B. The output data message is shown as being divided into two portions, namely a %Q portion for discrete outputs and a %AQ portion for analog outputs. The lengths of each portion are equal to the configured lengths of %Q and %AQ data selected for bus interface unit 120. Either length may be zero. If the GE Fanuc Series 90-70 bus controller is employed as bus controller 110, such bus controller automatically places the %Q data ahead of the %AQ data in accordance with the host PLC 105 configuration. Other PLC's and computers need to prearrange the data in the order expected by bus interface unit 120. Each discrete output module will receive one byte of data for each eight circuits. Each analog output will receive two bytes (one word) for each analog channel.

As soon as new output data are received, bus interface unit 120 checks it to be sure that the data is error-free and of the correct length. The length must match the combined lengths of the discrete output data and analog output data that have been configured for bus interface unit 120. After verifying the accuracy of the data, bus interface unit 120 puts the data in the %Q and %AQ tables, and begins passing it to the output modules 155 in station 180. It is noted that upon initial power-up, all outputs go to their programmed default state, except outputs which had previously been forced. Outputs which have previously been forced go immediately to their forced state or value. If host CPU communications are lost for 3 bus scans, all outputs that are not presently forced will either default or hold their last state, as configured. Conventional I/O modules can have a configured output default value. Intelligent modules default outputs are always zero in this particular embodiment.

Programmable bus interface unit 120 contains a I/O map which is selected by the user according to the I/O mapping selections of Table 1. The host PLC 105 can be mapped to micro field processor PLC 150 or the I/O ports (I/O modules) 155. Field PLC 150 can be mapped to the host PLC or to the I/O ports. The I/O ports can be mapped to the host PLC, to the field PLC or to other I/O ports. To set up this I/O mapping, an I/O map is formed and stored in the nonvolatile memory 320 of bus interface unit 120.

Figure 8:
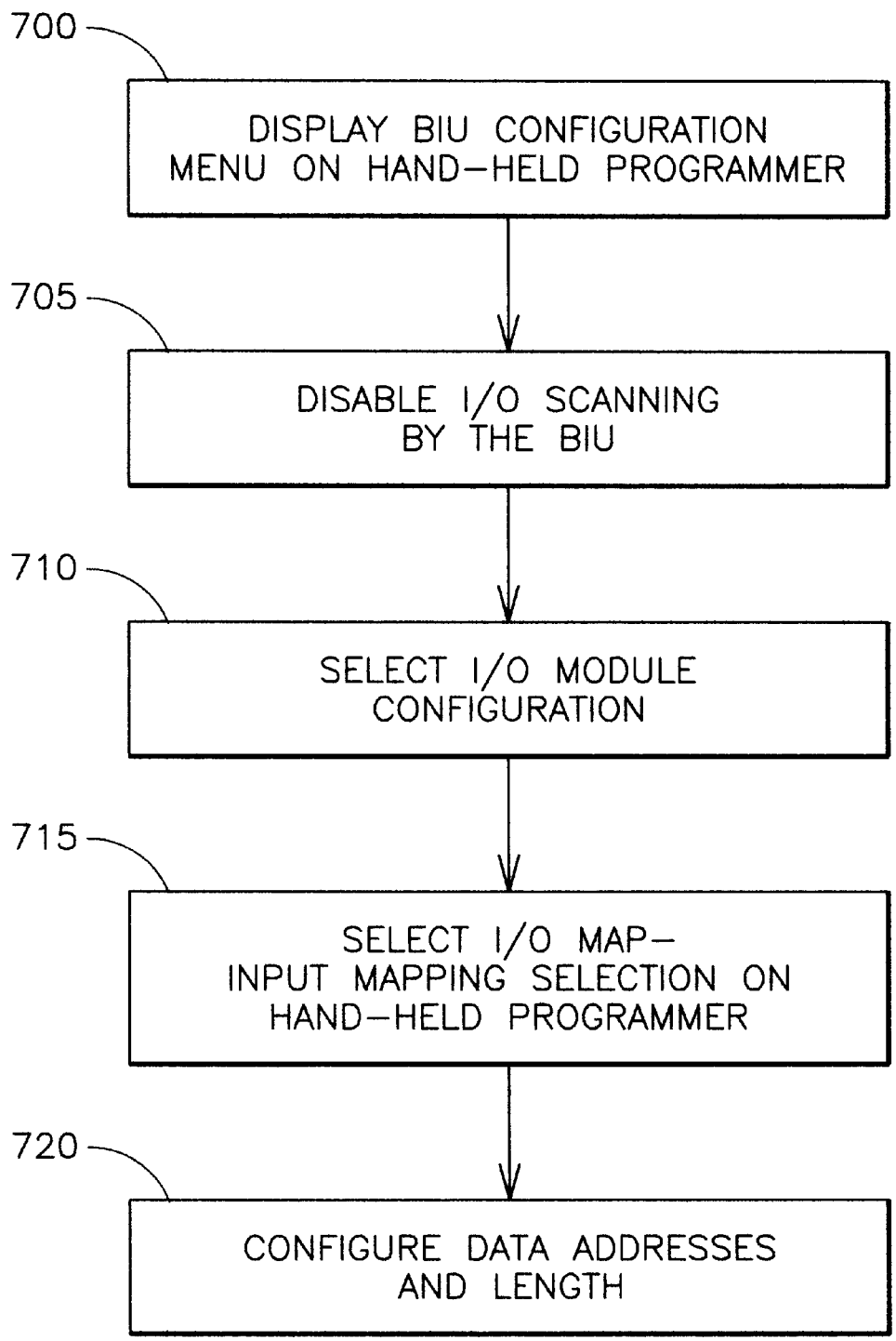
FIG. 8 is a flow chart depicting a process for generating an I/O map for the programmable bus interface unit of the system of FIG. 2.

To create an I/O map which stores the particular mappings among I/O ports, host PLC and field PLC desired by the user, the process set forth in the steps of flow chart of FIGS. 8 are followed. First, a bus interface unit configuration menu is displayed on hand-held programmer 170 or elsewhere in the system as indicated in block 700. The I/O scan performed by the bus interface unit is then disabled as per block 705. Then a "select I/O module configuration mode" is selected and the I/O modules are configured as per block 710. The individual I/O modules 155 in the station are configured to perform the particular functions desired in this step. The building of the I/O map is then commenced as per block 715. In the course of building the I/O map in memory 320, configuration of the data address and corresponding lengths for the references or entries of the I/O map is performed as per block 720. More particularly the starting address and lengths for the I discrete inputs (bits), the Q discrete outputs (bits), the A analog inputs (16 bit words) and AQ analog outputs (16 bit words) are assigned and stored. For each data type, a starting address and corresponding length is input via the hand-held programmer 150 and stored in memory 320. For each system component which the user desires to be mapped to another system component, an entry is made in the I/O map. The entry indicates the address of the originating system component and the address of the receiving system component. For example, assume that a particular I/O module 155 input port is the originating component and field processor 150 is the receiving component. The user indicates this selection on hand-held programmer 170. In this case where the user desires to map a particular I/O module 155 input port to field processor 150, a reference address indicating that input port as the originating component is stored along with a reference address indicating the field processor as the receiving component. These two pieces of reference address information together form an entry of the I/O map which is stored as a table in the BIU.

Another example of an entry in the I/O map is now discussed for the case where a particular I/O module 155 input port is the originating component and host PLC 105 is the receiving component. The user indicates this selection on hand-held programmer 170. In this case where the user desires to map a particular I/O module 155 input port to host PLC 105 a reference address indicating that input port as the originating component is stored along with a reference address indicating the host PLC as the receiving component. Again, these two pieces of reference address information together form an entry of the I/O map which is stored as a table in the BIU.

The I/O map is typically built up of many such entries. All the permutations set forth in Table 1 can be present in the I/O map although all such combinations need not be present in any particular I/O map stored in BIU 120.

It is noted that in one particular embodiment of the system, I/O scanning is configured by bus interface unit 120 which sends a configuration file that contains I/O type and length data to field processor 150. Field processor 150 sends and receives data to and from bus interface unit 120 via the I/O terminal block 135 to which field processor 150 is coupled. The input and output scans are based on field processor references I1-I512, Q1-Q512, AI1-AI128 and AO1-AQ128. References used by host PLC 105 will map to these field PLC references.

The foregoing has described a programmable logic controller computer system employing a micro field processor to provide local processing at the I/O module level. The disclosed programmable logic controller system includes a programmable bus interface unit which is programmed to control mapping among the host PLC, the field PLC and the I/O modules of the system. Communication among the I/O modules the micro field processor and the host programmable logic controller is flexibly specified and controlled. Bus traffic to and from the host PLC over the field bus is significantly reduced.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A programmable logic controller computer system comprising:
    a host programmable logic controller;
    a field bus coupled to the host programmable logic controller;
    a main bus;
    a plurality of I/O ports coupled to the main bus;
    a field programmable logic controller coupled to the main bus; and
    a programmable bus interface unit, coupled to the host programmable logic controller via the field bus and further coupled via the main bus to the plurality of I/O ports and the field programmable logic controller, the bus interface unit being programmable to control mapping between the host programmable logic controller, the plurality of I/O ports and the field programmable logic controller, and having means for mapping a selected one of the plurality of I/O ports to another one of the plurality of I/O ports.

2. The programmable logic controller computer system of claim 1 further comprising
    a programming unit, coupled to the programmable bus interface unit, for programming the programmable bus interface unit to set the mapping between the host programmable logic controller, the plurality of I/O ports and the field programmable logic controller.

3. The programmable logic controller computer system of claim 1 wherein the programmable bus interface unit includes means for mapping the host programmable logic controller to the field programmable logic controller.

4. The programmable logic controller computer system of claim 1 wherein the programmable bus interface unit includes means for mapping the host programmable logic controller to selected I/O ports.

5. The programmable logic controller computer system of claim 1 wherein the programmable bus interface unit includes means for mapping the field programmable logic controller to the host programmable logic controller.

6. The programmable logic controller computer system of claim 1 wherein the programmable bus interface unit includes means for mapping the field programmable logic controller to selected I/O ports.

7. The programmable logic controller computer system of claim 1 wherein the programmable bus interface unit includes means for mapping selected I/O ports to the host programmable logic controller.

8. The programmable logic controller computer system of claim 1 wherein the programmable bus interface unit includes means for mapping selected I/O ports to the field programmable logic controller.

9. The programmable logic controller computer system of claim 1 further comprising a plurality of I/O terminal blocks coupled to the main bus.

10. The programmable logic controller computer system of claim 1 further comprising respective I/O modules coupled to respective I/O terminal blocks, the I/O modules including the I/O ports, respectively.

11. The programmable logic controller computer system of claim 1 wherein the programmable bus interface unit comprises:
    a processor;
    a field bus interface coupling the processor to the field bus;
    a random access memory coupled to the processor;
    a read only memory coupled to the processor; and
    a non volatile memory coupled to the processor for an I/O map representing the mapping between the host programmable logic controller, the plurality of I/O ports and the field programmable logic controller.

12. The programmable logic controller computer system of claim 1 wherein the field programmable logic controller includes a processor for processing I/O information locally without involvement of the host programmable logic controller.

13. In a programmable logic controller computer system including a host programmable logic controller, a field bus being coupled to the host programmable logic controller, a programmable bus interface unit coupled between the field bus and a main bus including a plurality of I/O ports, a field programmable logic controller being coupled to the main bus, a method of operating the system comprising the steps of:
    initializing the programmable logic controller computer system;
    mapping, in the programmable bus interface unit, between the host programmable logic controller, the I/O ports and the field programmable logic controller;
    providing mapping information to the bus interface unit, the mapping information indicating mapping between the host programmable logic controller, the I/O ports and the field programmable logic controller, the mapping information further indicating mapping from a selected I/O port to another I/O port; and
    processing information from the I/O ports locally by the field programmable logic controller.

14. The method of claim 13 further comprising the step of storing the mapping information in the programmable bus interface unit.

15. The method of claim 13 further comprising the step of the programmable bus interface unit processing I/O information and routing I/O information according to the mapping information stored in the programmable bus interface unit.

16. The method of claim 13 further comprising the step of providing the mapping information to the programmable bus interface unit via a user operated hand-held programmer input device.

17. The method of claim 13 wherein the step of providing mapping information includes providing mapping information which maps the host programmable logic controller to the field programmable logic controller.

18. The method of claim 13 wherein the step of providing mapping information includes providing mapping information which maps the host programmable logic controller to selected I/O ports.

19. The method of claim 13 wherein the step of providing mapping information includes providing mapping information which maps the field programmable logic controller to the host programmable logic controller.

20. The method of claim 13 wherein the step of providing mapping information includes providing mapping information which maps the field programmable logic controller to selected I/O ports.

21. The method of claim 13 wherein the step of providing mapping information includes providing mapping information which maps selected I/O ports to the host programmable logic controller.

22. The method of claim 13 wherein the step of providing mapping information includes providing mapping information which maps selected I/O ports to the field programmable logic controller.

* * * * *